United States Patent
Wada et al.

(10) Patent No.: US 10,926,790 B2
(45) Date of Patent: Feb. 23, 2021

(54) VEHICLE-MOUNTED ELECTRONIC CONTROL UNIT AND VEHICLE-MOUNTED MECHANICALLY/ELECTRICALLY INTEGRATED ELECTRIC MOTOR

(71) Applicant: NIDEC ELESYS CORPORATION, Kanagawa (JP)

(72) Inventors: Eiji Wada, Kawasaki (JP); Kazuki Harada, Kawasaki (JP); Hitoshi Kuroyanagi, Kawasaki (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 1383 days.

(21) Appl. No.: 15/116,526

(22) PCT Filed: Feb. 5, 2015

(86) PCT No.: PCT/JP2015/053310
§ 371 (c)(1),
(2) Date: Aug. 4, 2016

(87) PCT Pub. No.: WO2015/119224
PCT Pub. Date: Aug. 13, 2015

(65) Prior Publication Data
US 2016/0347353 A1    Dec. 1, 2016

(30) Foreign Application Priority Data

Feb. 5, 2014    (JP) .................................. 2014-020782

(51) Int. Cl.
*B62D 5/04*        (2006.01)
*B60T 8/17*        (2006.01)
(Continued)

(52) U.S. Cl.
CPC .............. *B62D 5/0406* (2013.01); *B60K 6/26* (2013.01); *B60R 16/0231* (2013.01); *B60T 8/17* (2013.01);
(Continued)

(58) Field of Classification Search
CPC ......... H01L 2924/00; H01L 2924/0002; H01L 2924/13055; H01L 2924/00014; H01L 24/473
See application file for complete search history.

(56) References Cited

U.S. PATENT DOCUMENTS

2003/0127921 A1* 7/2003 Akutsu .................. H02K 11/21
                                                      310/68 R
2004/0174133 A1    9/2004 Miura et al.
(Continued)

FOREIGN PATENT DOCUMENTS

CN    1531172 A    9/2004
CN    103222161 A  7/2013
(Continued)

OTHER PUBLICATIONS

Translaion of JP2013106376A has been attached.*
(Continued)

*Primary Examiner* — Zoheb S Imtiaz
(74) *Attorney, Agent, or Firm* — Keating & Bennett

(57) ABSTRACT

A vehicle-mounted electronic controller includes a motor case that accommodates an electric motor, a lid body of the motor case, power circuitry including switching circuits that supply driving signals to the electric motor, and control circuitry including a control circuit that controls the switching circuits. The case further accommodates the power circuitry and the control circuitry. The lower surface of the lid body contacts the power circuitry. Each of the case and the lid body has a heat radiation property. The upper surface
(Continued)

of the lid body is exposed. A vehicle-mounted mechanically/ electrically integrated electric motor includes the vehicle-mounted electronic controller and the electric motor.

24 Claims, 13 Drawing Sheets

(51) Int. Cl.

| | | |
|---|---|---|
| *H02K 11/33* | (2016.01) | |
| *B60T 8/48* | (2006.01) | |
| *B60T 8/40* | (2006.01) | |
| *B60K 6/26* | (2007.10) | |
| *H02K 11/215* | (2016.01) | |
| *B60R 16/023* | (2006.01) | |
| *H02P 6/16* | (2016.01) | |
| *H02K 5/22* | (2006.01) | |
| *B60T 8/36* | (2006.01) | |
| *B60T 8/32* | (2006.01) | |

(52) U.S. Cl.
CPC .............. *B60T 8/4022* (2013.01); *B60T 8/48* (2013.01); *H02K 11/215* (2016.01); *H02K 11/33* (2016.01); *H02P 6/16* (2013.01); *B60T 8/326* (2013.01); *B60T 8/368* (2013.01); *B60T 2270/604* (2013.01); *H02K 5/225* (2013.01)

(56) References Cited

U.S. PATENT DOCUMENTS

| | | |
|---|---|---|
| 2011/0254388 A1 | 10/2011 | Yamasaki |
| 2014/0009016 A1 | 1/2014 | Seidenbinder et al. |
| 2016/0020678 A1* | 1/2016 | Hirano ..................... H02K 5/22 |
| | | 310/64 |

FOREIGN PATENT DOCUMENTS

| | | | |
|---|---|---|---|
| EP | 2 808 226 A1 | | 12/2014 |
| JP | 2003-204654 A | | 7/2003 |
| JP | 2013106376 A | * | 11/2011 |
| JP | 2013151206 A | * | 1/2012 |
| JP | 2013-063689 A | | 4/2013 |
| JP | 2013-106376 A | | 5/2013 |
| JP | 2013-151206 A | | 8/2013 |
| JP | 5287787 B2 | | 9/2013 |
| JP | 2013-201878 A | | 10/2013 |

OTHER PUBLICATIONS

Translation of JP2013151206A has been attached.*
Official Communication issued in International Patent Application No. PCT/JP2015/053310, dated May 12, 2015.

* cited by examiner

VEHICLE-MOUNTED ELECTRONIC CONTROL UNIT AND VEHICLE-MOUNTED MECHANICALLY/ELECTRICALLY INTEGRATED ELECTRIC MOTOR

BACKGROUND OF THE INVENTION

1. Field of the Invention

The present invention relates to an electronic controller mounted on a vehicle (a vehicle-mounted electronic controller), an electric motor provided integrally with the electronic controller (a vehicle-mounted mechanically/electrically integrated electric motor), and the like.

2. Description of the Related Art

A vehicle such as an automobile can include, for example, electronic power steering apparatus as a vehicle-mounted apparatus. The electric power steering apparatus generates auxiliary torque for assisting steering torque in a steering system generated through an operation by a driver on a steering handle. According to the generation of the auxiliary torque, the electric power steering apparatus can reduce a burden on the driver. An auxiliary torque mechanism, which applies the auxiliary torque, detects the steering torque of the steering system with a steering torque sensor, generates a driving signal with an electronic controller on the basis of a signal of the detection, generates, with an electric motor, auxiliary torque corresponding to the steering torque on the basis of the driving signal, and transmits the auxiliary torque to the steering system via a speed reduction mechanism.

For example, Japanese Patent Application Laid-Open No. 2013-63689 discloses the structure of a vehicle-mounted mechanically/electrically integrated electric motor. A first printed board (a control section) 14, a metal board (a power section) 16, and the like (an electronic control unit) shown in FIG. 2 of Japanese Patent Application Laid-Open No. 2013-63689 are provided integrally with an electric motor 8 shown in FIG. 3. According to contents of FIG. 1 of Japanese Patent Application Laid-Open No. 2013-63689, one end of a heat transfer member 26 is disposed on the metal board 16 and, on the other hand, the other end of the heat transfer member 26 is disposed in a microcomputer 24 on the first printed board 14 (see an alternate long and short dash line in FIG. 1 of Japanese Patent Application Laid-Open No. 2013-63689). Consequently, heat generated by the microcomputer 24 is transferred to the metal board 16.

However, for example, on the first printed board 14 of Japanese Patent Application Laid-Open No. 2013-63689, the microcomputer 24 needs to be disposed in a position corresponding to the heat transfer member 26. Therefore, a degree of freedom at the time when the first printed board 14 is designed decreases. According to the description of paragraph [0031] of Japanese Patent Application Laid-Open No. 2013-63689, an ECU housing 11 shown in FIG. 2 of Japanese Patent Application Laid-Open No. 2013-63689 has a heat radiation property. On the other hand, a lid body 12 of the ECU housing 11 shown in FIG. 2 of Japanese Patent Application Laid-Open No. 2013-63689 does not have the heat radiation property. Therefore, it is desirable that heat radiation efficiency is improved.

For example, Japanese Patent No. 5287787 discloses the structure of a vehicle-mounted mechanically/electrically integrated electric motor. A controller (an electronic control unit) such as a control section 30 and a power module (a power section) 40 shown in FIG. 7 of Japanese Patent No. 5287787 is formed integrally with a motor via a motor case 11. According to the description of paragraph [0038] of Japanese Patent No. 5287787, a cover 91 shown in FIG. 7 of Japanese Patent No. 5287787 has a magnetic shield property.

In a heat sink 80 of Japanese Patent No. 5287787, heat can be radiated not only to a side portion side of a plane section 83 and the like of the heat sink 80 but also to the cover 91 side. Therefore, the heat radiation efficiency of the heat sink 80 of Japanese Patent No. 5287787 is higher than the heat radiation efficiency of the ECU housing 11 of Japanese Patent Application Laid-Open No. 2013-63689. Note that, in order to fix the controller (the electronic control unit) such as the control section 30 and the power module (the power section) 40 shown in FIG. 7 of Japanese Patent No. 5287787 to the motor, in FIG. 2, FIG. 3, and FIG. 4 of Japanese Patent No. 5287787, the heat sink 80 is simply connected to the motor case 11. The heat radiation efficiency of the heat sink 80 of Japanese Patent No. 5287787 depends on a heat radiation capacity of the heat sink 80 itself. The heat radiation efficiency of the heat sink 80 of Japanese Patent No. 5287787 is higher than the heat radiation efficiency of the ECU housing 11 of Japanese Patent Application Laid-Open No. 2013-63689.

However, the cover 91 of Japanese Patent No. 5287787 is a member different from the heat sink 80 of Japanese Patent No. 5287787. The number of components or manufacturing cost increases. The cover 91 of Japanese Patent No. 5287787 deteriorates the heat radiation efficiency of the heat sink 80 of Japanese Patent No. 5287787.

SUMMARY OF THE INVENTION

Preferred embodiments of the present invention provide a vehicle-mounted mechanically/electrically integrated electric motor or a vehicle-mounted electronic controller, the mechanically/electrically integrated electric motor or the vehicle-mounted electronic controller having high heat radiation efficiency.

According to a first preferred embodiment of the present invention, a vehicle-mounted electronic controller that drives and controls an electric motor includes: a case including a controller housing; a lid body that covers an upper portion of the controller housing; power circuitry including a switching circuit that supplies a driving signal to the electric motor and a power board on which the switching circuit is mounted; and control circuitry including a control circuit that controls the switching circuit. The lid body is made of a material having a heat radiation property higher than the heat radiation property of the power circuitry. The controller housing accommodates the power circuitry and the control circuitry. The lower surface of the lid body is in contact with the upper surface of the power circuitry. The upper surface of the lid body is exposed.

According to the first preferred embodiment of the present invention, the lower surface of the lid body motor case is closely attached to the power circuitry including the switching circuit, which is a heat generating component. Therefore, the lid body having the heat radiation property radiates heat not only to the motor case side having the heat radiation property but also to the upper surface side of the lid body. Consequently, the electronic controller achieves high heat radiation efficiency.

The above and other elements, features, steps, characteristics and advantages of the present invention will become

DETAILED DESCRIPTION OF THE PREFERRED EMBODIMENTS

Preferred embodiments described below are used to easily understand the present invention. Therefore, those skilled in the art should be aware that the present invention is not unduly limited by the preferred embodiments described below.

Figure 2:
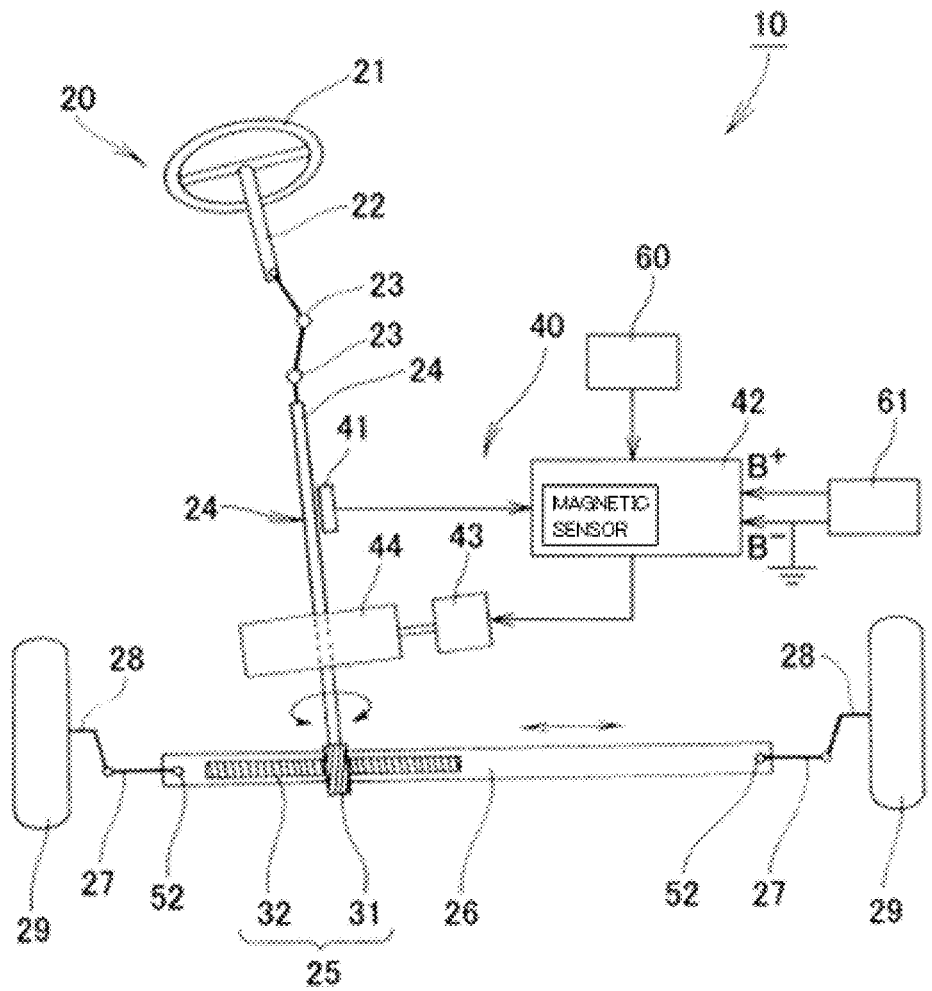
FIG. 2 shows a schematic configuration example of an electric power steering apparatus according to a preferred embodiment of the present invention.

FIG. 2 shows a schematic configuration example of an electric power steering apparatus 10. In the example shown in FIG. 2, the electric power steering apparatus 10 includes an electronic controller 42 used in electric power steering. Specifically, the electric power steering apparatus 10 includes an auxiliary torque mechanism 40 that applies auxiliary torque (also referred to as additional torque) to a steering system 20 extending from a steering handle (e.g., a steering wheel) 21 of a vehicle to steering wheels (e.g., front wheels) 29, 29 of the vehicle.

In the example preferred embodiment shown in FIG. 2, in the steering system 20, a rotating shaft 24 (also referred to as a pinion shaft and an input shaft) is coupled to the steering handle 21 via a steering shaft 22 (also referred to a steering column) and universal couplings 23, 23, a rack shaft 26 is coupled to the rotating shaft 24 via a rack and pinion mechanism 25, and left and right steering wheels 29, 29 are coupled to both ends of the rack shaft 26 via left and right ball joints 52, 52, tie rods 27, 27, and knuckles 28, 28. The rack and pinion mechanism 25 includes a pinion 31 included in the rotating shaft 24 and a rack 32 included in the rack shaft 26.

With the steering system 20, by steering the steering handle 21, a driver can steer steering wheels 29, 29 with steering torque of the steering handle 21 via the rack and pinion mechanism 25.

In the example preferred embodiment shown in FIG. 2, the auxiliary torque mechanism 40 is a mechanism that detects, with a steering torque sensor 41, the steering torque of the steering system 20 applied to the steering handle 21, generates a driving signal with the electronic controller 42 on the basis of a signal of the detection (also referred to as torque signal), generates, with an electric motor 43, auxiliary torque (additional torque) corresponding to the steering torque on the basis of the driving signal, transmits the auxiliary torque to the rotating shaft 24 via a speed reduction mechanism 44 (e.g., a warm gear mechanism), and transmits the auxiliary torque from the rotating shaft 24 to the rack and pinion mechanism 25 of the steering system 20.

The electric power steering apparatus 10 is classified into a pinion assist type, a rack assist type, a column assist type, and the like according to a place where the auxiliary torque is applied to the steering system 20. The electric power steering apparatus 10 shown in FIG. 2 shows the pinion assist type. However, the electric power steering apparatus 10 may also be applied to the rack assist type, the column assist type, and the like if so desired.

The electric motor 43 is, for example, a brushless motor. A rotation angle of a rotor in the brushless motor or a rotation angle of the electric motor 43 (also referred to as rotation signal) is detected by the electronic controller 42. The rotor is defined by, for example, a permanent magnet. The electronic controller 42 is able to detect a movement of the permanent magnet (the N pole and the S pole) with a magnetic sensor.

The electronic controller 42 is provided by, for example, a power supply circuit, a current sensor that detects a motor current (an actual current), a microprocessor, a Field Effect Transistor (FET) bridge circuit, and a magnetic sensor. Not only the torque signal, but also, for example, a vehicle speed signal are able to be input to the electronic controller 42 as an external signal. An external apparatus 60 is another electronic controller capable of communicating in an interior network such as a CAN (Controller Area Network). However, the external apparatus 60 may be, for example, a vehicle speed sensor that outputs a vehicle speed pulse equivalent to the vehicle speed signal. The external signal includes a signal on a system side such as the torque signal and a signal on a vehicle body side (a vehicle body signal) such as the vehicle speed signal. The vehicle body signal can include not only the vehicle speed signal and a communication signal of engine speed and the like but also an ON/OFF signal of an ignition switch. A microprocessor of the electronic controller 42 is able to perform vector control of the electric motor 43 on the basis of, for example, the torque signal and the vehicle speed signal. An FET bridge circuit controlled by the microprocessor is preferably provided by, for example, switching circuits that energize the electric motor 43 (the brushless motor) with a driving current (a three-phase AC current), specifically, for example, an FET 1, an FET 2, an FET 3, an FET 4, an FET 5, and an FET 6 shown in FIG. 8. A magnetic sensor 310 is provided by, for example, a Hall IC (see FIG. 7).

Such an electronic controller 42 sets a target current on the basis of at least steering torque (a torque signal). The electronic controller 42 preferably sets the target current also taking into account vehicle speed (a vehicle speed signal and a vehicle speed pulse) detected by the vehicle speed sensor and a rotation angle (a rotation signal) of the rotor detected by the magnetic sensor. The electronic controller 42 is configured or programmed to control a driving current (a driving signal) of the electric motor 43 such that a motor current (an actual current) detected by the current sensor coincides with the target current.

B+ indicates, for example, the potential of a positive electrode of a battery 61 provided in the vehicle as a DC power supply. B− indicates the potential of a negative electrode of the battery 61. The potential B− of the negative electrode is able to be grounded on the vehicle body of the vehicle. Note that the electronic controller 42 includes input terminals B+ and B− (a first input terminal and a battery terminal), for example, in a connector (e.g., a connector in the front of FIG. 7, i.e., a connector in the inner side of FIG. 4) of an external connector of a connector case 440 (see FIG. 7). The connector case 440 is able to supply electric power supplied from the battery 61 to the electronic controller 42. A power supply voltage (a difference between the potential B+ of the positive electrode and the potential B− of the negative electrode) is a source of a driving signal of the electric motor 43.

With the electric power steering apparatus 10 shown in FIG. 2, it is possible to steer the steering wheels 29 with the rack shaft 26 using composite torque obtained by adding the auxiliary torque (the additional torque) of the electric motor 43 to the steering torque of the driver.

Figure 3:
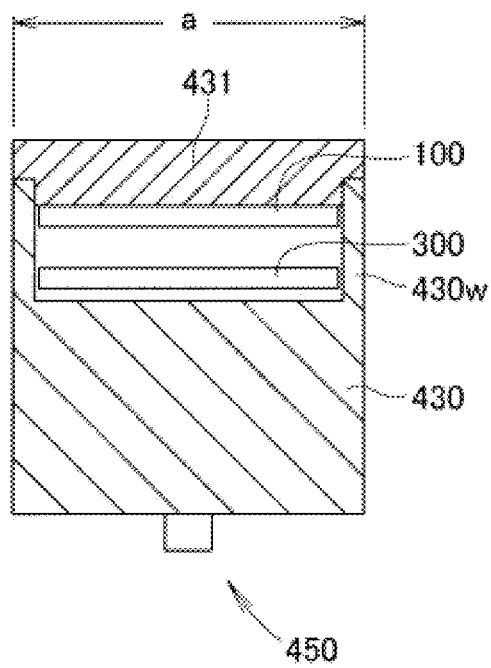
FIG. 3A shows a schematic configuration example of a mechanically/electrically integrated electric motor according to a preferred embodiment of the present invention and FIG. 3B a disposition example of an O-ring.
Figure 3:
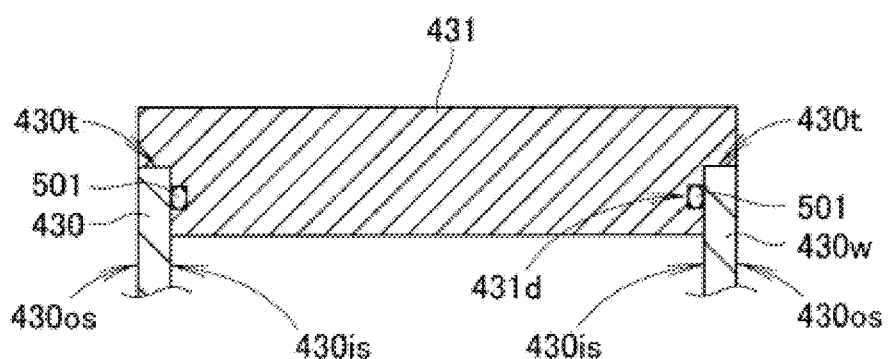

FIG. 3A shows a schematic configuration example of a mechanically/electrically integrated electric motor according to a preferred embodiment of the present invention. FIG. 3B shows a disposition example of an O-ring. In the example shown in FIG. 3A, the mechanically/electrically integrated electric motor includes a case 430 which preferably includes a motor case 447 that accommodates the electric motor 43 shown in FIG. 2 and a controller housing 420 that accommodates power circuitry 100 and control circuitry 300 described below. The mechanically/electrically integrated electric motor further includes a lid body 431 of the case 430, power circuitry 100 including the switching circuits (e.g., the FET 1 to FET 6 shown in FIG. 8) that supply driving signals to the electric motor 43, and control circuitry 300 including a control circuit (see FIG. 10) that controls the switching circuits. The case 430 shown in FIG. 3A accommodates the power circuitry 100 and the control circuitry 300. The motor case 447 (or the electric motor 43), the lid body 431, the power circuitry 100, and the control circuitry 300 are disposed, for example, in the direction of a motor shaft 450 of the electric motor 43 in the order of the motor case 447 (or the electric motor 43), the control circuitry 300, the power circuitry 100, and the lid body 431. In addition, the lower surface of the lid body 431 is closely attached to the power circuitry 100, each of the case 430 and the lid body 431 is provided by, for example, metal having a heat radiation property. The upper surface of the lid body 431 of the case 430 is exposed.

The case 430 preferably includes the controller housing 420 and the motor case 447. The controller housing 420 and the motor case 447 may be separately provided or may be integrally provided. However, if the controller housing 420 and the motor case 447 are separate, problems described below occur. FIG. 1A shows a first comparative example. As shown in FIG. 1A, the heat sink 400 is closely attached to the power circuitry 100. Therefore, the heat sink 400 shown in FIG. 1A can also have high heat radiation efficiency. However, the controller housing 420 that accommodates the power circuitry 100 and the control circuitry 300 is a member different from the heat sink 400 (or the motor case 447). The number of components or manufacturing cost increases. In addition, when an electronic controller or a mechanically/electrically integrated electric motor having a waterproof property is provided, a waterproof member is necessary between the heat sink 400 and the controller housing 420 shown in FIG. 1A. Another waterproof member is required between the controller housing 420 and the case 430. The controller housing 420 is interposed between the heat sink 400 and the case 430, which are members different from the controller housing 420. Therefore, heat transfer from the heat sink 400 to the case 430 is delayed. Therefore, the heat radiation efficiency of the heat sink 400 shown in FIG. 1A is deteriorated. As measures against these problems, if the controller housing 420 and the motor case 447 are integrated, the controller housing 420 that accommodates the power circuitry 100 and the control circuitry 300 is a member different from the heat sink 400 (or the case 430). It is possible to realize a reduction in the number of components or the manufacturing cost. Further, it is also possible to remove the other waterproof member necessary between the controller housing 420 and the case 430. The controller housing 420 is interposed between the heat sink 400 and the case 430, which are the members different from the controller housing 420. Therefore, the heat transfer from the heat sink 400 to the case 430 is not delayed. Therefore, if the controller housing 420 and the motor case 447 are integrated, there is an effect that it is possible to solve the deterioration in the heat radiation efficiency of the heat sink 400 shown in FIG. 1A.

Note that FIG. 1B shows a second comparative example. As shown in FIG. 1B, when the controller housing 420 has a heat radiation property or is a heat sink, it is possible to significantly reduce or prevent the increase in the number of components or the manufacturing cost. However, when the size (the length) in the motor shaft 450 direction of the electric motor is taken into account, a waterproof member is disposed between the controller housing 420 and the case 430 shown in FIG. 1B. Therefore, the size (width "b") in the radial direction of the case 430 shown in FIG. 1B increases more than the size (width "a") in the radial direction of the case 430 shown in FIG. 1A. In particular, in FIG. 1B, the waterproof member is able to be set in contact with the perpendicular inner wall surface of the case 430. If the waterproof member is in contact with the horizontal bottom surface of the wall of the controller housing 420, the size (the thickness) of the wall of the controller housing 420 increases. The size (the width "b") in the radial direction of the case 430 further increases. As measures against such a problem, if the controller housing 420 and a case 430 are integrated, it is possible to solve the problem of the increase in the size (the thickness) of the wall of the controller housing 420.

When the control circuitry 300 is disposed in the controller housing 420 shown in FIG. 1B, work efficiency is deteriorated. In other words, the space between the inner wall surface of the controller housing 420 and the motor case 447 is narrow. It is difficult to fix the control circuitry 300 and the power circuitry 100 to the controller housing 420. When the control circuitry 300 and the power circuitry 100 are disposed in the controller housing 420 shown in FIG. 1B by a machine rather than manual work, the machine needs to have high accuracy concerning the disposition. Therefore, equipment of the machine increases. Therefore, manufacturing cost of the electronic controller increases. As measures against such a problem, if the controller housing 420 and the motor case 447 are integrated, the lid body 431 does not need to include a wall that accommodates the power board 101 and the like. It is easy to fix the power board 101 and the like to the lid body 431. It is possible to reduce difficulty of assembly for disposing the control circuitry 300 and the power circuitry 100 in the controller housing 420 using the machine. That is, it is possible to solve the problem of the increase in the manufacturing cost of the electronic controller.

A vehicle-mounted electronic controller of a preferred embodiment of the present invention includes the case 430 including the controller housing 420, the lid body 431 that covers the upper portion of the controller housing 420, the power circuitry 100 including the switching circuits that supply driving signals to the electric motor 43 and the power board 101 on which the switching circuits are mounted, and the control circuitry 300 including the control circuit that controls the switching circuits. The lid body 431 is made of a material having a heat radiation property higher than the heat radiation property of the power board 101. The controller housing 420 accommodates the power circuitry 100 and the control circuitry 300. The lower surface of the lid body 431 is in contact with the upper surface of the power circuitry 100. The upper surface of the lid body 431 is exposed.

The lower surface of the lid body 431 of the case 430 is closely attached to the power circuitry 100 including the switching circuits, which are the heat generating components. Therefore, the lid body 431 made of the material having the heat radiation property higher than the heat radiation property of the power board 101 is able to radiate heat not only to the case 430 side having the heat radiation property but also to the upper surface side of the lid body 431. However, the power board 101 is preferably defined by a bare board which does not include copper foil and the like. Consequently, the mechanically/electrically integrated power motor or the electronic controller 42 is able to have high heat radiation efficiency. In particular, the lid body 431 made of the material having the high heat radiation property is in direct contact with the case 430 having the heat radiation property. An area of the contact of the lid body 431 having the heat radiation property with the case 430 (a wall 430w) having the heat radiation property is preferably large. In other words, when the lid body 431 is simply fixed to the case 430 (the wall 430w), the lid body 431 and the case 430 (the wall 430w) may be in contact with each other only in several places. Therefore, when the area of the contact of the lid body 431 with the case 430 (the wall 430w) is the maximum, heat moving from the lid body 431 to the case 430 is maximized. In addition, when each of the case 430 and the lid body 431 has the heat radiation property or is the heat sink, it is possible to significantly reduce or prevent an increase in the number of components or manufacturing cost. The lid body 431 not only simply functions as the heat sink but also moves the heat to the case 430 via the area of the contact of the lid body 431 with the case 430 (the wall 430w). Therefore, it is unnecessary to increase the capacity of the lid body 431 more than necessary. Therefore, the lid body 431 is small and light.

FIG. 3B is an enlarged view of the lid body 431 in direct contact with the case 430 in the FIG. 3A. When the electronic controller 42 shown in FIG. 2 has a waterproof property, the mechanically/electrically integrated electric motor or the electronic controller 42 is able to include a waterproof member, specifically, an O-ring 501 shown in FIG. 3B. On the other hand, when the mechanically/electrically integrated electric motor does not have the waterproof property, the mechanically/electrically integrated electric motor does not have to include the waterproof member. Consequently, it is possible to reduce the manufacturing cost of the mechanically/electrically integrated electric motor. The lid body 431 shown in FIG. 2(A) is able to include a recess such as a groove 431d to which the O-ring 501 can be fixed. For example, in sectional view shown in FIG. 3B, the wall 430w (referring to FIG. 6, a hollow cylinder) of the case 430 includes an inner wall surface 430is and an outer wall surface 430os perpendicular to, for example, the lower surface of the lid body 431 and a top surface 430t parallel to, for example, the lower surface of the lid body 431. The groove 431d corresponds to the inner wall surface 430is (the inner side of the hollow cylinder).

The O-ring 501 may close a gap between the groove 431d of the lid body 431 and the perpendicular inner wall surface 430is of the case 430. That is, the O-ring 501 is able to provide the mechanically/electrically integrated electric motor or the electronic controller 42 having the waterproof property using the perpendicular inner wall surface 430is of the case 430. In addition, the O-ring 501 is in contact with the perpendicular inner wall surface 430is of the case 430. Therefore, it is possible to provide the mechanically/electrically integrated electric motor or the electronic controller 42 small in size. In other words, if the position of the groove 431d moves to the horizontal top surface 430t of the wall 430w and the O-ring 501 comes into contact with the horizontal top surface 430t of the wall 430w of the case 430, the size (the thickness) of the wall 430w of the case 430 increases and the size (the width "a") in the radial direction of the case 430 increases. The size (the width "a") in the radial direction of the case 430 shown in FIG. 3A is specified by the perpendicular outer wall surface 430os of the wall 430w of the case 430. As shown in FIG. 3B, a heat radiation property (a contact surface with the lid body 431) is provided on the horizontal top surface 430t of the wall 430w and a waterproof property is provided on the perpendicular inner wall surface 430is of the wall 430w. Consequently, it is possible to significantly reduce or prevent an increase in the size (the width "a") in the radial direction of the case 430. It is possible to set the area of the contact of the lid body 431 with the case 430 (the wall 430w) to a maximum limit.

Figure 4:
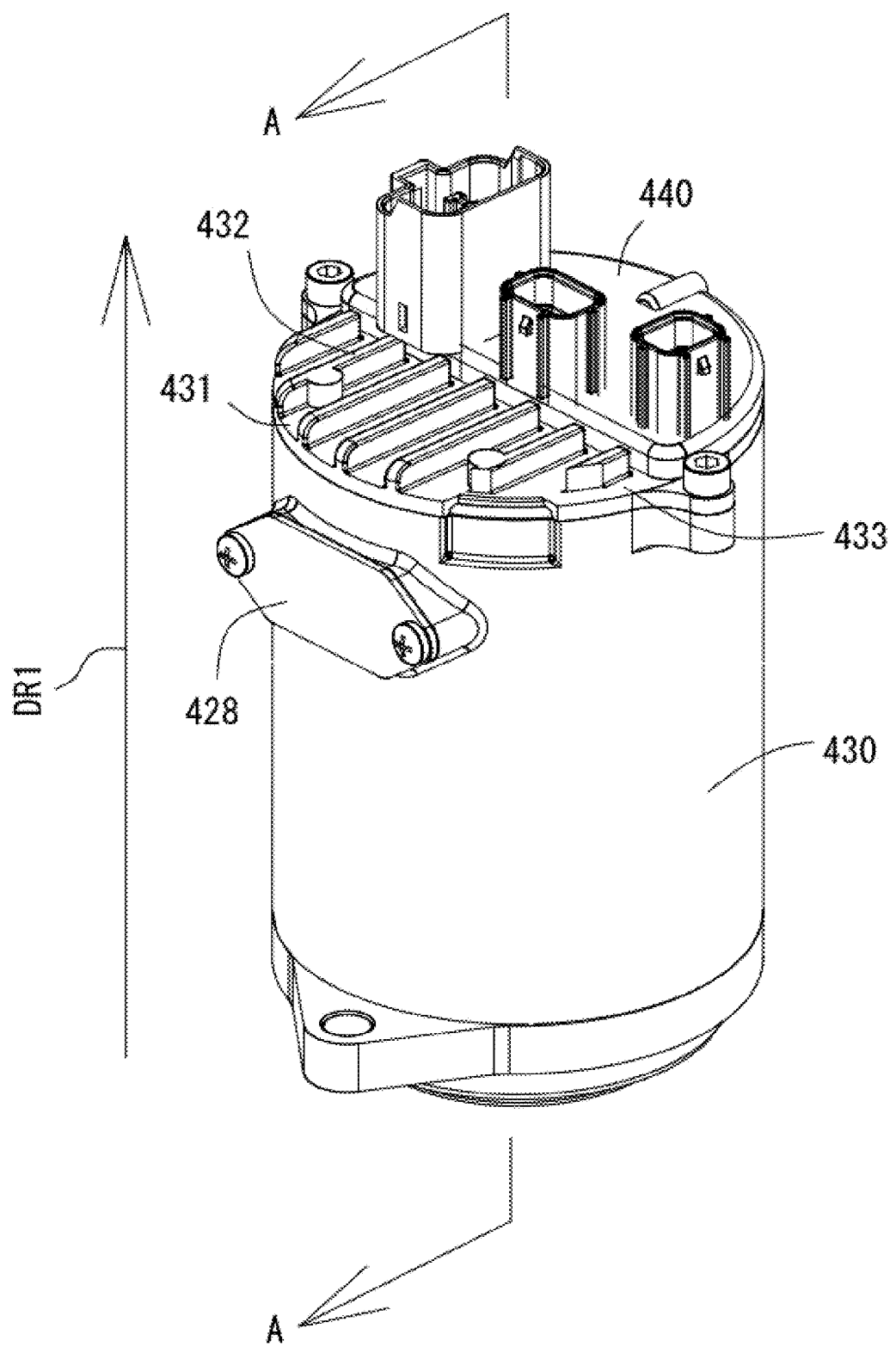
FIG. 4 shows an exterior example of the mechanically/electrically integrated electric motor according to a preferred embodiment of the present invention.

FIG. 4 shows an exterior example of the mechanically/electrically integrated electric motor according to a preferred embodiment of the present invention. In the preferred embodiment shown in FIG. 4, the lid body 431 of the case 430 includes a plurality of the heat radiation fins. The plurality of the heat radiation fins can be designed such that, when heat is radiated to the upper surface side of the lid body 431, the heat is not held up on the upper surface of the lid body 431. In addition, the connector case 440 is set in a portion of the upper surface of the lid body 431. In other words, not the entire upper surface of the lid body 431 is covered by the connector case 440. Therefore, the remaining portion (an exposed portion exposed to the outside) of the upper surface of the lid body 431 is able to continue to radiate the heat to the upper surface side of the lid body 431.

The external connector of the connector case 440 shown in FIG. 4 includes a connector (e.g., a connector in the center) to which a torque signal detected by the steering torque sensor 41 shown in FIG. 2 is input. Since the connector, to which the torque signal is input, is provided in a portion of the upper surface of the lid body 431 of the case 430, it is possible to significantly reduce or prevent a protrusion (a protrusion in the radial direction of the case 430) of the connector and provide the electronic controller 42 small in size. In addition, an engine, a transmission, and the like not shown in the figure are present around the electronic controller 42. A space in which the electronic controller 42 is disposed is sometimes limited. Therefore, when there is such limitation, it is easy to dispose the small electronic controller 42 in an engine room.

In addition, in the example shown in FIG. 4, the electronic controller 42 is provided integrally with the electric motor 43 such that the electronic controller 42 is disposed in the direction of the motor shaft 450 of the electric motor 43 shown in FIG. 2. In the example shown in FIG. 4, when a direction DR1 indicates an upward direction of the electric motor 43, the electronic controller 42 is able to be provided integrally with the electric motor 43 in an upper portion of the electric motor 43 or the case 430. Note that the connector case 440 includes the input terminals B+ and B− (the first input terminal and the battery terminal) and includes a plurality of terminals (a second input terminal and signal terminals) that connect the steering torque sensor 41 and the like and the electronic controller 42 (see FIG. 7).

Figure 5:
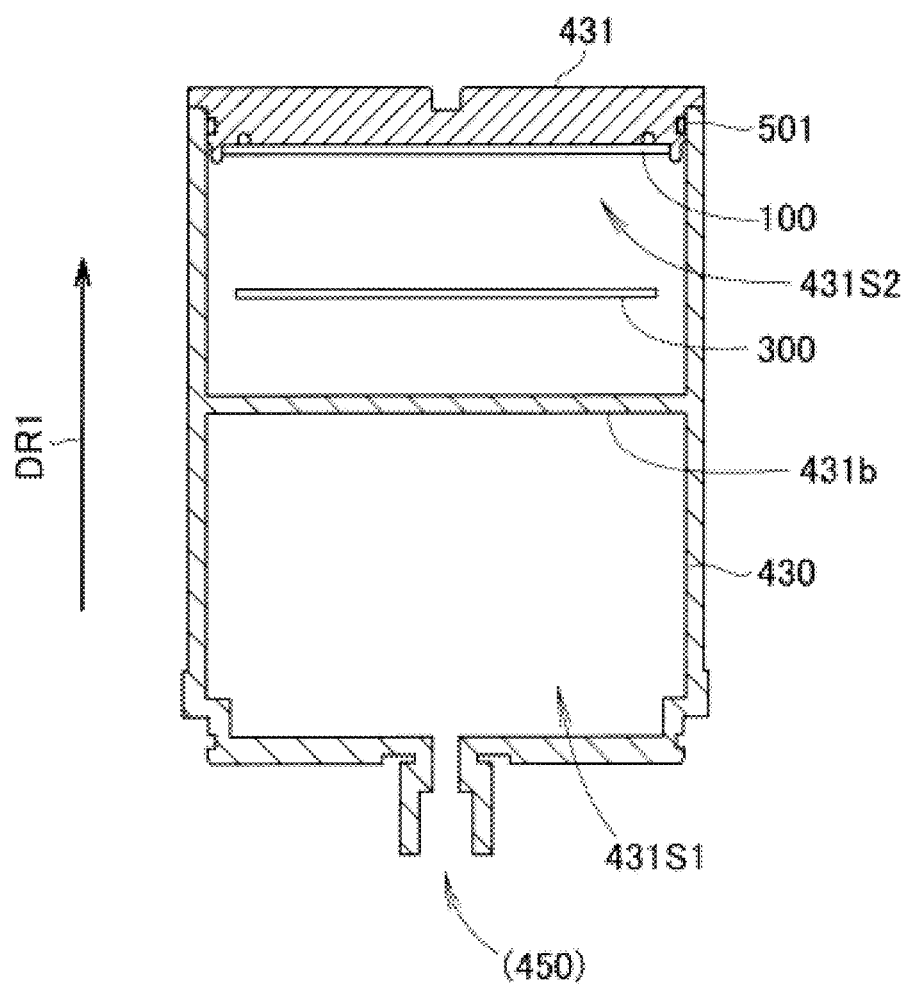
FIG. 5 shows an example of a sectional view of the mechanically/electrically integrated electric motor shown in FIG. 4.

FIG. 5 shows an example of a sectional view (an A-A sectional view) of the mechanically/electrically integrated electric motor shown in FIG. 4. However, in the example shown in FIG. 5, the connector case 440 is omitted. As shown in FIG. 5, the case 430 includes a space 431S1 to accommodate a motor 43-2 shown in FIG. 2 and a space 431S2 to accommodate the power circuitry 100 and the control circuitry 300. The connector case 440 shown in FIG. 6 includes, on the space 431S1 side, a hole in which the motor shaft 450 or an output shaft of the electric motor 43 is able to be inserted. For example, an oil seal is used for the motor shaft 450 or the output shaft. The electronic controller 42 has a waterproof property. The connector case 440 shown in FIG. 5 may further include a partition wall 431b that separates the spaces 431S1 and 431S2.

Figure 6:
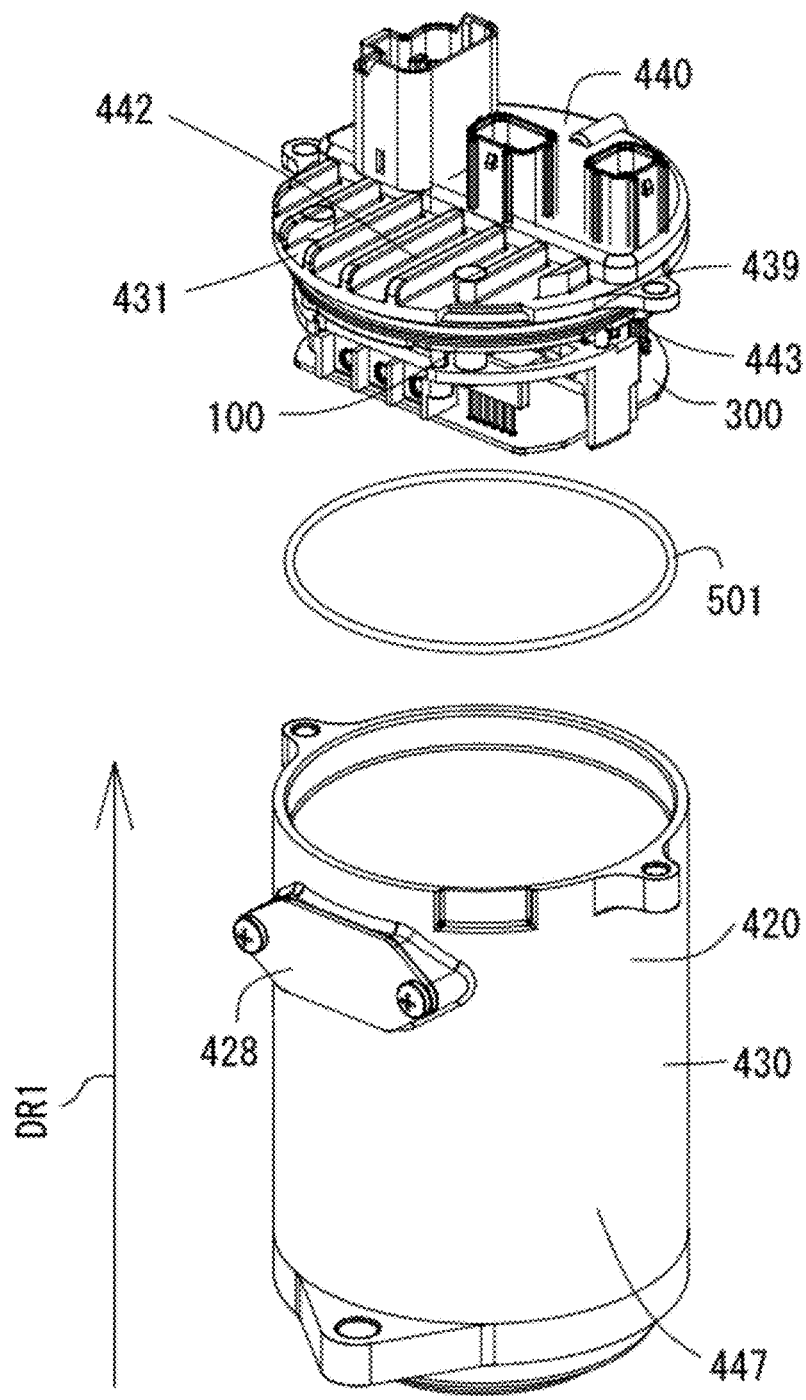
FIG. 6 shows an example of an assembly explanatory diagram of the mechanically/electrically integrated electric motor shown in FIG. 4.

FIG. 6 shows an example of an assembly explanatory diagram of the mechanically/electrically integrated electric motor shown in FIG. 4. As shown in FIG. 6, in a state in which the power circuitry 100 and the control circuitry 300 (and the connector case 440) are fixed to the lid body 431, it is possible to insert the lid body 431 into the case 430 and assemble the electronic controller 42 shown in FIG. 4. Naturally, since the O-ring 501 is provided between the lid body 431 and the case 430, the O-ring 501 is elastically deformed. Consequently, the mechanically/electrically integrated electric motor having a waterproof property is provided. The lid body 431 is able to be fixed to the case 430 more firmly via a fixing member (not shown).

Figure 7:
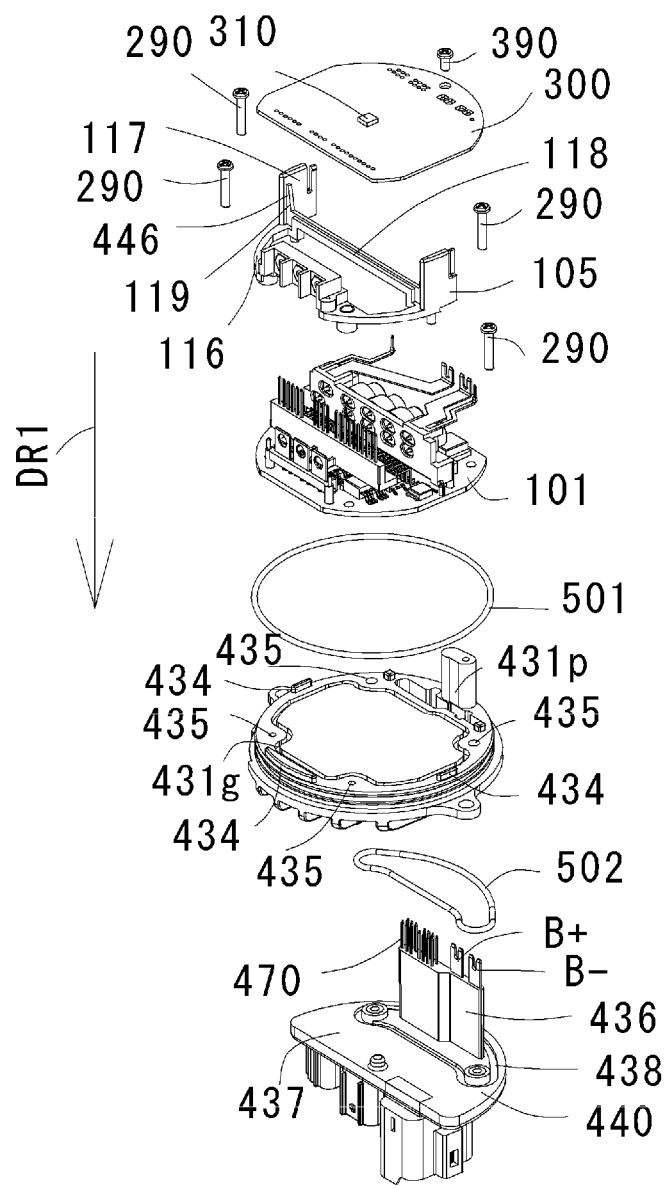
FIG. 7 shows an example of an exploded perspective view of an electronic controller shown in FIG. 4.

FIG. 7 shows an example of an exploded perspective view of the electronic controller 42 shown in FIG. 2. As shown in FIG. 7, which is vertically reversed, the lower surface of the lid body 431 is able to be fixed to the upper surface of the power circuitry 100 via first fixing members, specifically, male screws 290. Specifically, the lower surface of the lid body 431 is able to be fixed to the upper surface of the power board 101 via the male screws 290. Between the lower surface of the power circuitry 100 and the upper surface of the control circuitry 300, a frame 105 used when connecting an output of the control circuitry 300, specifically, output terminals U, V, and W shown in FIG. 8 and a three-phase line of the electric motor 43 is inserted. In addition, the lid body 431 shown in FIG. 7 may include a pedestal 431p extends from a lower surface of the main body to an upper surface of the control circuitry and capable of supporting the upper surface of the control circuitry 300. The control circuitry 300 is able to be fixed to the pedestal 431p via second fixing members, specifically, male screws 390.

In a state in which the control circuitry 300 and the power circuitry 100 are fixed to the lid body 431, the control circuitry 300 and the power circuitry 100 is able to be accommodated in the case 430 (see FIG. 6). Therefore, when the control circuitry 300 and the power circuitry 100 are fixed to the lid body 431, since nothing is present around the control circuitry 300 and the power circuitry 100, it is possible to significantly reduce or prevent deterioration in work efficiency. Since the control circuitry 300 is directly fixed to the lid body 431 via the pedestal 431p rather than to the power circuitry 100, accuracy of the position (the height) of the control circuitry 300 is high. Therefore, for example, accuracy of the position (the height) of the magnetic sensor 310 disposed on the lower surface of the control circuitry 300 is also high. In other words, variation (a product error) of a rotation signal representing a rotation angle of the electric motor 43 is small. Note that the O-ring 501 having a circular shape shown in FIG. 7 can be fixed to the groove 431d shown in FIG. 3B in advance. An annular O-ring 502 shown in FIG. 7 is able to seal a gap between the lid body 431 and the connector case 440.

Explaining more in detail with reference to FIG. 6 and FIG. 7, the vehicle-mounted electronic controller 42 preferably includes the connector case 440 extending from the lower side of the lid body 431 toward the upper side of the lid body 431. The connector case 440 includes the external connector projecting farther to the upper side than the upper surface of the lid body 431. The control circuitry 300 overlaps the power circuitry 100 in the vertical direction on the lower side of the power circuitry 100.

A reduction in the size in the radial direction is realized by disposing, in the axial direction, the connector case 440 including the external connector, the power circuitry 100, and the control circuitry 300.

Further, the lid body 431 includes a main body 433 extending perpendicularly to the vertical direction and a heat radiation fin 432 extending toward the upper side from the upper surface of the main body 433.

Figure 12:
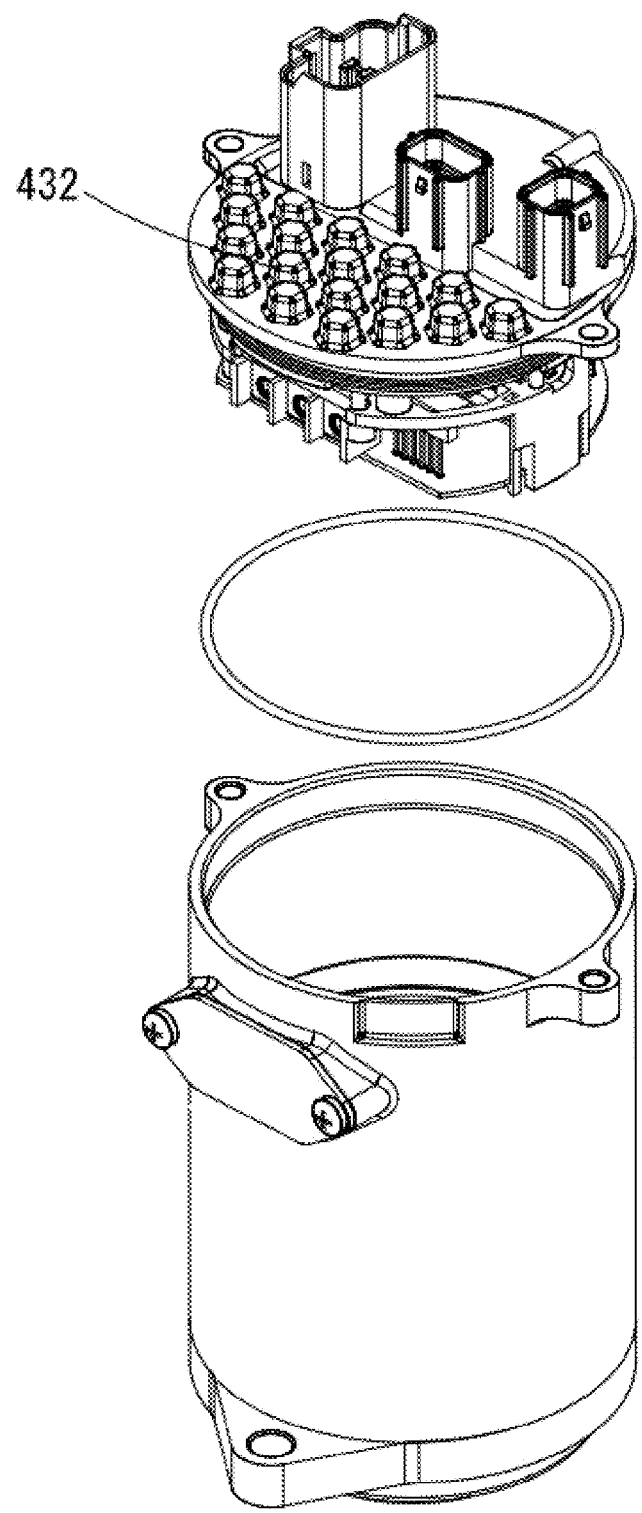
FIG. 12 shows an example of an assembly explanatory diagram of the mechanically/electrically integrated electric motor shown in FIG. 4.
Figure 13:
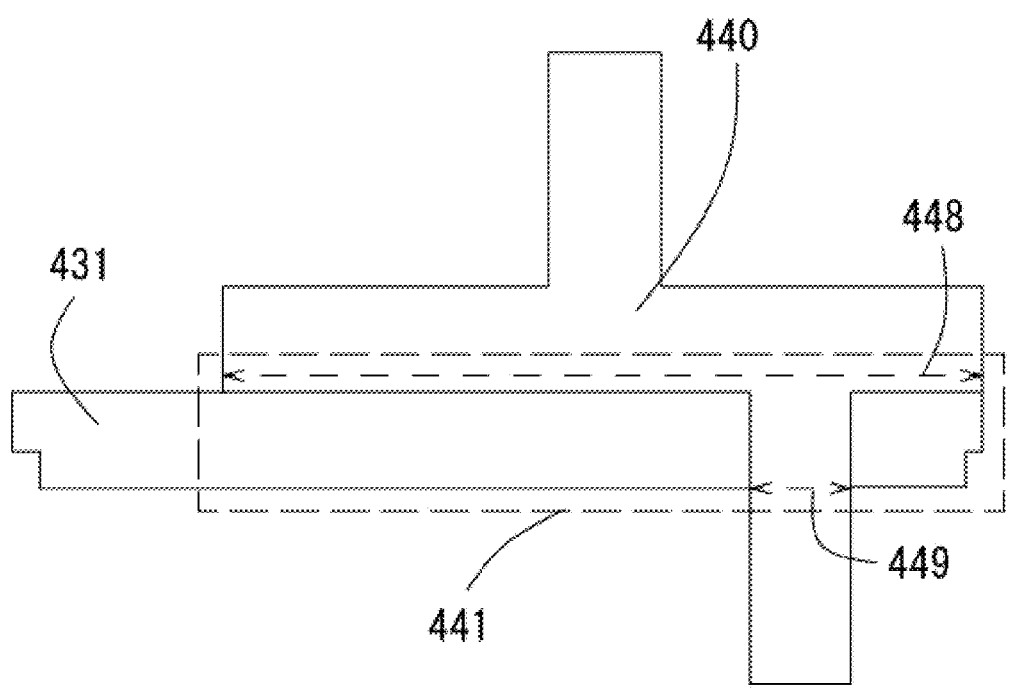
FIG. 13 shows a schematic diagram for explaining a region of the mechanically/electrically integrated electric motor shown in FIG. 4.

Since the lid body 431 includes the thermal radiation fin 432 extending toward the upper side, it is possible to more efficiently radiate generated heat of the power circuitry 100. The shape of the heat radiation fin 432 is not limited if the heat radiation fin 432 is designed such that, when the heat radiation fin 432 radiates heat to the upper surface side of the lid body 431, the heat is not held up on the upper surface of the lid body 431. For example, as shown in FIG. 4, the heat radiation fin may include a plurality of ribs. As shown in FIG. 12, the heat radiation fin may include a plurality of protrusions.

In the vehicle-mounted electronic controller 42, a region farther on the inner side than the controller housing 420 in plan view includes a connector region 441 where the connector case 440 is disposed and a heat radiation fin region 442 where the heat radiation fin is disposed on the upper surface of the lid body 431.

In the connector region 441, the connector case 440 is in contact with the upper surface of the main body 433. By adopting such a configuration, it is possible to significantly reduce or prevent a tilt of the external connector by setting one side of the main body 433 and the other side of the connector case 440 in surface contact with each other. Further, since the tilt of the external connector is able to be significantly reduced or prevented, an ease of attachment of the vehicle-mounted electronic controller 42 is improved.

The power circuitry 100 is thermally in contact with the lower side of the heat radiation fin region 442 in the main body 433. By adopting such a configuration, it is possible to efficiently radiate, from the heat radiation fin 432, generated heat from the power circuitry 100.

The switching circuits are disposed in a position overlapping the heat radiation fin 432 in the vertical direction.

Since the switching circuits and the heat radiation fin 432 are disposed in the axial direction, it is possible to efficiently radiate generated heat from the switching circuits.

A heat conduction material is disposed between the upper surface of the power circuitry 100 and the lower surface of the main body 433. A lid groove 431*g* extending along a portion in contact with the power circuitry 100 is provided on the lower surface of the main body 433. The main body 433 includes, on the outer side of the lid groove 431*g*, projections 434 extending along the lid groove 431*g* and projecting toward the lower side. The projections 434 are disposed on the outer side of the power circuitry 100.

Since the heat conduction material (preferably, heat-conducing grease for example) is present, a heat radiation effect of heat generated from the power board 101 is further improved. Since the lid groove 431*g* is present, the grease does not scatter and is disposed in a predetermined position. Since the projections 434 that guide the position of the power circuitry 100 are present on the outer side of the groove, it is possible to further reduce or prevent the heat conduction material (the grease) from scattering to places other than a place between the power board 101 and the lid body 431.

The power board 101 is fixed to the main body 433 by first fixing members 290. That is, the power circuitry 100 is fixed to the main body section 433 by first fixing members 290. The main body 433 includes sections to be fixed 435 into which the first fixing members 290 are inserted. The sections to be fixed 435 are disposed on the outer side of the lid grooves 431*g*.

The heat conduction material accumulates in the lid grooves 431*g*, such that the heat conduction material is prevented from reaching the sections to be fixed 435, to which the first fixing members 290 are fixed, present on the outer side of the lid grooves 431*g*. Consequently, it is possible to prevent tightening of the fixing member 290 from weakening.

At least a portion of the power board 101 overlaps the heat radiation fin 432 and the connector case 440 in the vertical direction.

The power board 101 is disposed in a position where the heat radiation fin 432 and at least a portion of the connector case 440 overlap in the motor shaft direction, such that generated heat of the power board 101 is efficiently radiated by the heat radiation fin 432. Further, the power board 101 is disposed in a position where the connector case 440 and the motor shaft overlap, such that a reduction in the size in the radial direction of the vehicle-mounted electronic controller 42 is realized.

The connector region 441 preferably includes a lower connector region 449 on the lower side of the lid body 431 and an upper connector region 448 on the upper side of the lid body 431. The upper connector region 448 has an area larger than the area of the lower connector region 449. That is, the upper connector region is a region where a tabular extension 437 and the main body 433 overlap. The lower connector region is a region where an internal connector is disposed.

The connector case 440 further includes a plurality of terminals 470 connected to the outside via an external connector, the tabular extension 437 spreading perpendicularly to the vertical direction from the lower side of the external connector, and an internal connector 436 projecting farther to the lower side than the lid body 431 from the tabular extension 437 and including the plurality of terminals 470 disposed on the inside. The internal connector 436 is disposed farther apart from the heat radiation fin region 442 than the external connector.

The external connector is disposed farther on the heat radiation fin region 442 side than the internal connector 436. Consequently, it is possible to dispose the external connector effectively using the radial direction width of a motor. Therefore, an ease of attachment of the vehicle-mounted electronic controller 42 is improved.

Further, by disposing the external connector close to the heat radiation fin region, it is possible to realize a reduction in the size in the radial direction of the external connector. Since the internal connector 436 is spaced away from the heat radiation fin region, it is possible to increase an area of the power board 101 in contact with the main body.

The external connector preferably includes a connector to which a torque signal is input.

The plurality of terminals 470 are connected to the control circuitry 300. Portions of the plurality of terminals 470 connected to the control circuitry 300 are exposed from the internal connector 436. With such a configuration, since the portions of the plurality of terminals 470 connected to the control circuitry 300 are exposed from the internal connector 436, it is easy to perform soldering and the like.

The internal connector 436 extends farther downward than the lower surface of the power board 101. With such a configuration, the plurality of terminals 470 can be connected to the control circuitry 300 without coming into contact with the power board 101.

The lower surface of the tabular extension 437 preferably includes a connector groove 438 that is in contact with the upper surface of the lid body 431 and surrounds the internal connector 436. The O-ring 502 is disposed in the connector groove 438. On the lower surface of the tabular extension 437, a region not surrounded by the connector groove 438 is larger than a region surrounded by the connector groove 438.

The tabular extension 437 is disposed in a position in contact with the upper surface of the lid body 431. Consequently, it is possible to secure an area of the contact of the power board 101 with the lid body 431. The waterproof property is improved by limiting a region waterproofed by the connector groove 438 and the O-ring 502.

Further, since the region is narrow, it is possible to prevent a decrease in the waterproof effect even if the connector slightly tilts.

The controller housing 420 includes the wall 430*w*, which has a hollow cylindrical shape. The lid body 431 includes, at the outer edge portion of the lower surface, an attaching section 439 recessed in the upward direction. The lower surface of the attaching section 439 is in contact with at least a portion of the top surface of the wall 430*w*. In a sectional view of the side surface of the attaching section 439 including a recess 443 in which the O-ring 501 is able to be fixed, the wall 430*w* includes an inner wall surface 430*is* corresponding to the recess 443 and perpendicular to the lower surface of the lid body 431. The O-ring 501 is in contact with the recess 443 of the lid body 431 and the inner wall surface 430*is*.

Waterproofing is able to be achieved because the O-ring 501 and the lid body 431 are in contact. Heat can be transferred from the lid body 431 to the wall 430w because the lower surface of the attaching section 439 and the top surface of the wall 430w are in contact at least in a portion. Therefore, it is possible to further improve the heat radiation efficiency.

The lid body 431 includes the pedestal 431p extends from a lower surface of the main body to an upper surface of the control circuitry and that supports the upper surface of the control circuitry 300. The control circuitry 300 is fixed to the pedestal 431p via a second fixing member 390. The side surface of the internal connector is in contact with the side surface of the pedestal 431p.

It is possible to improve the strength of the internal connector extending from the tabular extension 437 to the control circuitry 300.

In the motor, the case 430 further includes the motor case 447 that accommodates the electric motor 43-2. The controller housing 420 and the motor case 447 are integrally provided.

Since the controller housing 420 and the motor case 447 are integrally provided as a single monolithic member, it is possible to reduce cost and improve heat transfer efficiency.

Incidentally, as measures to reduce conduction noise (motor noise), at least one electrolytic capacitor 210 (see FIG. 8) is preferably inserted between the input terminal B+ and the input terminal B− of the connector. A large number of components (the FET 1 to the FET 11 and a shunt resistor R1 to a shunt resistor R3) are mounted on the power circuitry 100 (e.g., the metal board). Therefore, in the power circuitry 100 (e.g., the metal board), for example, a space to mount four electrolytic capacitors 210 (see FIG. 9A) and a space to connect the input terminals B+ and B− cannot be secured. Therefore, on the control circuitry 300, it is possible to electrically connect the input terminals B+ and B− and the at least one electrolytic capacitor 210. In order to electrically connect the input terminal B− and the lid body 431 shown in FIG. 7 on the control circuitry 300, the pedestal 431p is provided in the lid body 431. The pedestal 431p is able to directly connect the lid body 431 (and the motor case 430 electrically connected to the lid body 431) and the control circuitry 300 at low impedance. Consequently, the conduction noise is reduced.

Figure 8:
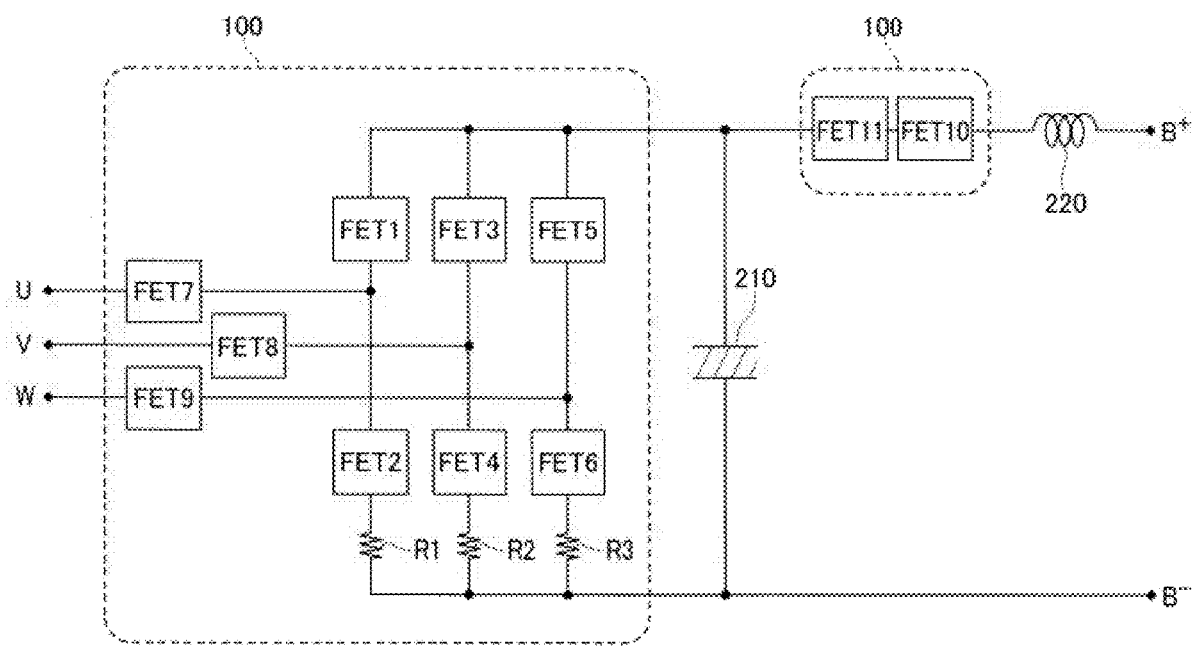
FIG. 8 shows an example of a circuit configuration diagram representing power circuitry shown in FIG. 5.

FIG. 8 shows an example of a circuit configuration diagram representing the power circuitry 100 shown in FIG. 5. In the example shown in FIG. 8, B+ represents an input terminal to input the potential of the positive electrode of the battery 61 shown in FIG. 2. B−represents an input terminal to input the potential of the negative electrode of the battery 61. The power circuitry 100 generates, with the FET 1 to the FET 6, driving signals for the electric motor 43 shown in FIG. 2. The power circuitry 100 includes the three output terminals U, V, and W to output the driving signals. The driving signals are generated on the basis of, for example, the power supply voltage (the difference between the potential B+ of the positive electrode and the potential B− of the negative electrode) input from the two input terminals B+ and B− (the first input terminal and the battery terminal) shown in FIG. 7. In the example shown in FIG. 8, the six FETs 1 to 6, which are the switching circuits, are connected to a line of the potential B+ of the input terminal of the positive electrode and a line of the potential B− of the input terminal of the negative electrode in parallel to the at least one electrolytic capacitor 210. The at least one electrolytic capacitor 210 preferably includes, for example, four electrolytic capacitors (see FIG. 9A).

The FET 1 and the FET 2 are connected in series between the line of the potential B+ of the positive electrode and the line of the potential B− of the negative electrode. The FET 1 and the FET 2 are able to generate a U-phase current that flows through, for example, a U winding wire of the electric motor 43. As a current sensor to detect the U-phase current, for example, the shunt resistor R1 is able to be provided between the FET 2 and the line of the potential B− of the negative electrode. As a semiconductor relay capable of interrupting the U-phase current, for example, an FET 7 is able to be provided between a connection node of the FET 1 and the FET 2 and the output terminal U to the electric motor 43.

The FET 3 and the FET 4 are connected in series between the line of the potential B+ of the positive electrode and the line of the potential B− of the negative electrode. The FET 3 and the FET 4 are able to generate a V-phase current flowing through, for example, a V winding wire of the electric motor 43. As a current sensor to detect the V-phase current, for example, the shunt resistor R2 is able to be provided between the FET 4 and the line of the potential B− of the negative electrode. As a semiconductor relay capable of interrupting the V-phase current, for example, an FET 8 is able to be provided between a connection node of the FET 3 and the FET 4 and the output terminal V to the electric motor 43.

The FET 5 and the FET 6 are connected in series between the line of the potential B+ of the positive electrode and the line of the potential B− of the negative electrode. The FET 5 and the FET 6 are able to generate a W-phase current flowing through, for example, a W winding wire of the electric motor 43. As a current sensor to detect the W-phase current, for example, the shunt resistor R3 is able to be provided between the FET 6 and the line of the potential B− of the negative electrode. As a semiconductor relay capable of interrupting the W-phase current, for example, an FET 9 is able to be provided between a connection node of the FET 5 and the FET 6 and the output terminal W to the electric motor 43.

In the example shown in the FIG. 8, the six FETs 1 to 6, which are the switching circuits, are able to supply the U-phase current, the V-phase current, and the W-phase current to the electric motor 43 as driving signals. The at least one electrolytic capacitor 210 is able to smooth the power supply voltage (the difference between the potential B+ of the positive electrode and the potential B− of the negative electrode), which is the source of the driving signals. The FET 1, the FET 3, and the FET 5 are connected to the line of the potential B+ of the positive electrode via, for example, an FET 10 and an FET 11 functioning as semiconductor relays capable of interrupting electric power from the battery 61 and, for example, a coil 220 functioning as a noise filter. The coil 220 is able to absorb noise included in the potential B+ of the positive electrode.

Figure 9:
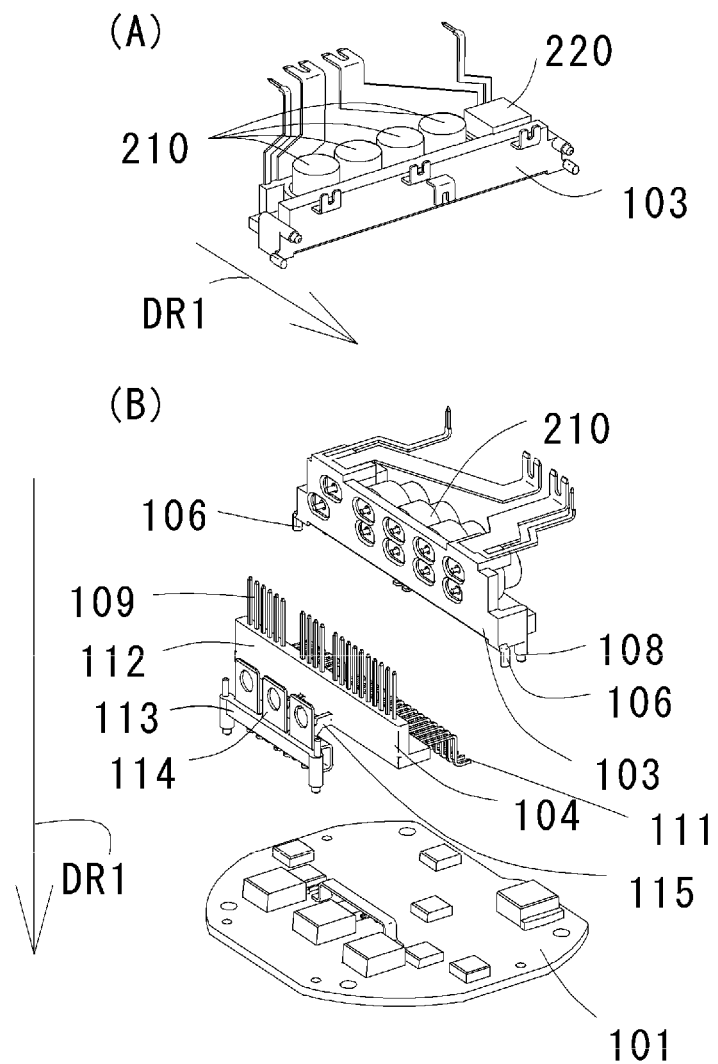
FIG. 9A shows an example of a perspective view of a main structure of a first component of the power circuitry shown in FIG. 7
FIG. 9B shows an example of an assembly explanatory diagram of the power circuitry shown in FIG. 7.

The FET 1 to the FET 11 and the shunt resistor R1 to the shunt resistor R3 shown in FIG. 8 are mounted on a metal board shown in FIG. 9B. The at least one electrolytic capacitor 210 and the coil 220 shown in FIG. 8 are provided on the metal board shown in FIG. 9B as a first component shown in FIG. 9A. The output wires U, V, and W shown in FIG. 4 and a plurality of signal lines not shown in FIG. 4 are provided on the metal board shown in FIG. 9B as a second component.

FIG. 9A shows an example of a perspective view of a main structure of the first component of the power circuitry 100 shown in FIG. 7. FIG. 9B shows an example of an assembly explanatory diagram of the power circuitry 100 shown in FIG. 7. In the example shown in FIG. 9B, the power circuitry 100, which is the metal board, includes the FET 1 to the FET 11 and the shunt resistor R1 to the shunt resistor R3. The first component and the second component are attached to the metal board. However, the power circuitry 100 is not limited to the example shown in FIG. 9B. In other words, the at least one electrolytic capacitor 210 (and the coil 220) are three-dimensionally disposed on the metal board, such that the power circuitry 100 small in size is provided. The power circuitry 100 may be a power module of a mold type. However, the power circuitry 100 is preferably included with a metal board of a non-mold type shown in FIG. 9B is inexpensive.

The vehicle-mounted electronic controller further includes the first component on the lower surface. The first component preferably includes the at least one electrolytic capacitor 210, a first frame 103 that fixes the electrolytic capacitor 210 and is connected to the power circuitry 100, a leg 106 that extends in the upward direction from the upper end of the first frame 103 and is in contact with the power circuitry 100, and a connector 108 that extends from the first frame 103 toward the control circuitry 300. The at least one electrolytic capacitor 210 overlaps, in the vertical direction, other components mounted on the power circuitry 100.

Since the vehicle-mounted electronic controller includes the first component, it is possible to dispose the electrolytic capacitor 210 under the other components of the power circuitry 100. It is possible to reduce the power circuitry 100 in size with respect to a direction perpendicular to the vertical direction. Since the connector 108 extends from the first frame 103, a wire that should originally be present on the power circuitry 100 is absent. A degree of freedom of a layout of the power circuitry 100 is improved. Alternatively, it is possible to reduce the power circuitry 100 in size.

The at least one electrolytic capacitor 210 is fixed to the side surface of the first frame 103.

Since the electrolytic capacitor 210 is disposed laterally, it is possible to reduce the power circuitry 100 in size in the vertical direction as well.

The connector 108 extends in the direction perpendicular to the vertical direction from the lower side of a portion of the first frame 103 where the electrolytic capacitor 210 is fixed.

The connector 108 extends in the perpendicular direction from the lower side of the portion of the first frame 103 where the electrolytic capacitor 210 is fixed. Consequently, it is possible to further reduce the power circuitry 100 in size in the axial direction.

In the example shown in FIG. 9A, a main structure of the first component is defined by the four electrolytic capacitors 210, one coil 220, and a plurality of connection terminals. The first frame 103 shown in FIG. 9A is preferably formed by molding the plurality of connection terminals with, for example, resin. The four electrolytic capacitors 210 and the one coil 220 are provided on the bottom surface (a first surface) of the first frame 103 (see FIG. 9B). The four electrolytic capacitors 210 and the one coil 220 are able to be fixed to the bottom surface (the first surface) of the first frame 103 by a joining member such as solder, for example. Similarly, a main structure of the second component is able to be defined by a plurality of signal lines and the three output terminals U, V, and W. A second frame 104 shown in FIG. 9B is preferably formed by molding the plurality of signal lines and the three output terminals U, V, and W with, for example, resin.

Note that the FET 1 to the FET 11, the shunt resistor R1 to the shunt resistor R3, and the first component and the second component are able to be collectively mounted on the surface (the lower surface) of the metal board by, for example, reflow soldering. In other words, the FET 1 to the FET 11, the shunt resistor R1 to the shunt resistor R3, and the first component and the second component are able to be surface-mounted on the power circuitry 100. Specifically, a joining member such as, for example, cream solder (not shown in the figure) is preferably printed in advance between the surface (the lower surface) of the metal board and the components such as the FET 1 to the FET 11 and the shunt resistor R1 to the shunt resistor R3. The components such as the FET 1 to the FET 11 and the shunt resistor R1 to the shunt resistor R3 are attached on the cream solder. Similarly, a joining member such as, for example, cream solder (not shown in the figure) is preferably printed in advance in a connection region on the surface (the lower surface) of the metal board. The first component and the second component are able to be attached on the cream solder. Subsequently, these kinds of the cream solder are heated to connect the FET 1 to the FET 11, the shunt resistor R1 to the shunt resistor R3, and the first component and the second component to the surface (the lower surface) of the metal board.

When, for example, the six FETs 1 to 6 and the four electrolytic capacitors 210 are mounted on the surface (the lower surface) of the metal board, the four electrolytic capacitors 210 are mounted on the first surface (the bottom surface of the frame 103) different from (specifically, orthogonal to) the surface (the lower surface) of the metal board. In other words, the four electrolytic capacitors 210 are able to be three-dimensionally disposed on the surface (the lower surface) of the metal board. Consequently, it is possible to suppress a protrusion (a protrusion in the radial direction of the motor case 430) of the electronic controller 42 and provide the electronic controller 42 small in size. Further, for example, the six FETs 1 to 6 and the first component (and the second component) are able to be collectively mounted on the surface (the lower surface) of the metal board. Therefore, it is possible to simplify a manufacturing process for the electronic controller 42.

The vehicle-mounted electronic controller further includes a second component. The second component includes a plurality of signal lines 109 and a second frame 104 that bundles the plurality of signal lines 109. The power circuitry 100 and the control circuitry 300 are connected by the plurality of signal lines 109. The plurality of signal lines 109 respectively include bent portions 111 extending in the vertical direction from the power circuitry 100 and being bent in the direction perpendicular to the vertical direction. Electronic components mounted on the power circuitry 100 are disposed on the upper side of the second frame 104 or the bent portions 111.

The power circuitry 100 is able to be reduced in size in the direction perpendicular to the vertical direction.

The second frame 104 preferably includes a signal-line fixing section 112 that bundles the plurality of signal lines 109, an output-terminal fixing section 113 that bundles a plurality of output terminals 114 extending in the downward direction from the power circuitry 100, and a bridge 115 that couples the signal-line fixing section 112 and the output-terminal fixing section 113. A direction in which the signal-line fixing section 112 bundles the plurality of signal lines 109 and a direction in which the output-terminal fixing section 113 bundles the plurality of output terminals 114 are parallel or substantially parallel.

By adopting such a configuration, it is possible to efficiently dispose the second component on the power circuitry 100. Therefore, it is possible to reduce the power circuitry 100 in size in the direction perpendicular to the vertical direction.

The first frame 103 fixes the plurality of electrolytic capacitors 210 in parallel to the direction in which the power circuitry 100 extends. A direction in which the first frame 103 fixes the plurality of electrolytic capacitors 210 and a direction in which the signal-line fixing section 112 bundles the plurality of signal lines 109 are substantially parallel.

Since the first component and the second component are able to be efficiently disposed on the power circuitry 100, it is possible to reduce the power circuitry 100 in size in the direction perpendicular to the vertical direction.

The vehicle-mounted electronic controller shown in FIG. 7 preferably further includes a third frame 105. The third frame 105 includes a plurality of controller holders 117 that hold the control circuitry 300 and a coupler 118 that couples the plurality of controller holders 117. A direction in which the coupler 118 extends is substantially parallel to a direction in which the first frame 103 fixes the plurality of electrolytic capacitors 210 and a direction in which the signal-line fixing section 112 bundles the plurality of signal lines 109.

The first component and the second component are able to be efficiently disposed on the power circuitry 100. Therefore, it is possible to reduce the power circuitry 100 in size in the direction perpendicular to the vertical direction.

The coupler 118 is disposed between the first frame 103 and the signal-line fixing section 112.

The first component and the second component are able to be efficiently disposed on the power circuitry 100. Therefore, it is possible to reduce the power circuitry 100 in size in the direction perpendicular to the vertical direction.

In the vehicle-mounted electronic controller, the coupler 118 includes a rib 119 extending to the lower side from the lower surface of the coupler 118. The rib 119 is connected to the inner surfaces of the plurality of controller holders 117.

By adopting such a structure, it is possible to improve the strength of the controller holders 117.

In the vehicle-mounted electronic controller, the top surface of the rib 119 is in contact with the upper surface of the control circuitry 300.

With the above-described features, a positioning accuracy of the control circuitry 300 is improved.

Figure 10:
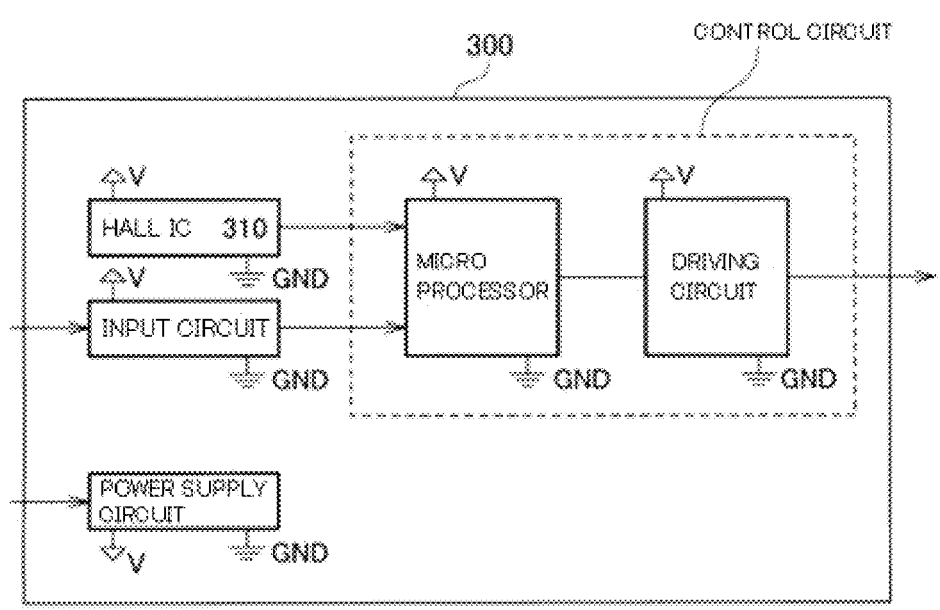
FIG. 10 shows an example of a functional block diagram of control circuitry shown in FIG. 7.

FIG. 10 shows an example of a functional block diagram of the control circuitry 300 shown in FIG. 7. In FIG. 7, a control circuit, an input circuit, and a power supply circuit are not shown and are omitted. On the other hand, in the example shown in FIG. 10, the control circuitry 300 may also preferably include, not only the magnetic sensor 310 but also a control circuit, an input circuit, and a power supply circuit. In the example shown in FIG. 10, the control circuit of the control circuitry 300 is provided by, for example, a microprocessor and a driving circuit.

The control circuit shown in FIG. 10 controls at least the FET 1 to the FET 6 shown in FIG. 8. The microprocessor of the control circuit is able to set a target current. The target current is set according to a torque signal and a motor current (an actual current) captured via the input circuit, a rotation signal captured via the magnetic sensor 310, and the like. The driving circuit of the control circuit generates, on the basis of the target current, six control signals (gate signals) corresponding to the FET 1 to the FET 6. The FET 1 and the FET 6 are turned on or off by the six control signals (gate signals). Consequently, a driving signal (a driving current) is supplied to the electric motor 43.

The control circuit can also control semiconductor relays (the FET 7 to the FET 11). In this case, the microprocessor of the control circuit determines ON or OFF of each of the FET 7 to the FET 11. The driving circuit of the control circuit is able to generate, on the basis of the determination of ON or OFF of the FET 7 to the FET 11, five control signals (gate signals) corresponding to the FET 7 to the FET 11. The plurality of signal lines of the second frame 104 on the metal board shown in FIG. 9B can not only carry, for example, the gate signals corresponding to the FET 1 to the FET 11 but also carry signals indicating the potentials of the shunt resistor R1 to the shunt resistor R3. It is possible to electrically connect the circuit configuration diagram of FIG. 8 and the functional block diagram of FIG. 10.

In the example of FIG. 10, the power supply circuit is able to generate a power supply for the magnetic sensor 310, the input circuit, the microprocessor, and the driving circuit. In other words, the power supply circuit is able to convert the power supply voltage (the difference between the potential B+ of the positive electrode and the potential B− of the negative electrode) of the battery 61 shown in FIG. 2 into a power supply voltage (a difference between potential V and potential GND) of a logic.

Figure 11:
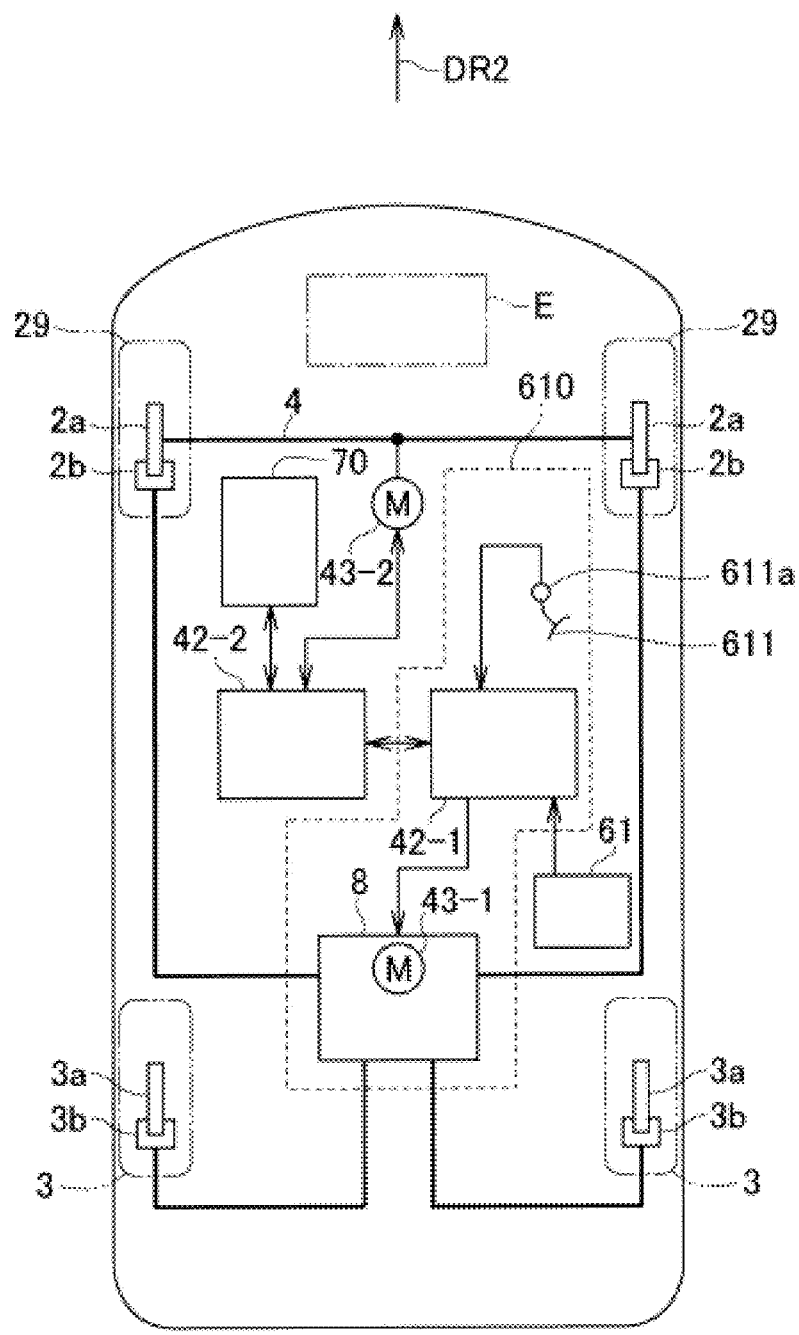
FIG. 11 shows a schematic configuration example of an electric servo brake system having a regenerative brake function according to a preferred embodiment of the present invention.

FIG. 11 shows a schematic configuration example of an electric servo brake system having a regenerative brake function. In FIG. 2, the mechanically/electrically integrated electric motor is applied to the electric power steering apparatus 10 (the first embodiment). On the other hand, in FIG. 11, the mechanically/electrically integrated electric motor is applied to an electric servo brake system (a second embodiment). Naturally, the mechanically/electrically integrated electric motor may be applied to other vehicle-mounted apparatuses.

FIG. 11 schematically shows the schematic structure of a vehicle (an electric vehicle) mounted with, for example, an electronic controller 42-1 and an electric motor 43-1 for an electric servo brake. For example, like the electronic controller 42 and the electric motor 43 shown in FIG. 2, for example, the electronic controller 42-1 and the electric motor 43-1 shown in FIG. 11 are able to define, for example, the mechanically/electrically integrated electric motor having the structure shown in FIG. 6. As shown in FIG. 11, the vehicle includes a pair of steering wheels 29, 29 (front wheels) disposed in a front portion of the vehicle and a pair of rear wheels 3, 3 disposed in a rear portion of the vehicle. Torque from the electric motor 43-2 is transmitted to, via a differential mechanism (not shown in the figure), a front wheel axle (a drive shaft) 4 coupled to the left and right steering wheels 29, 29.

A driving battery 70 having a capacity larger than the capacity of the battery 61 (a battery used to power electric equipment) is connected to the driving electric motor 43-2. A driving electronic controller 42-2 is able to control the electric motor 43-2 and the driving battery 70 such that electric power of the driving battery 70 is supplied to the driving electric motor 43-2 and generated power by the driving electric motor 43-2 charges the driving battery 70. The driving electric motor 43-2 functions as both of a driver providing vehicle traveling and a generator providing regeneration to convert speed reduction energy into electric power and generate a regenerative braking force during speed reduction. Specifically, collection of electricity is started at an instance when the driver releases a foot from an accelerator pedal (not shown in the figure). Speed reduction by the driving electric motor 43-2 is able to be increased when the driver steps on a brake pedal 611. Consequently, more electricity is generated and the driving battery 70 is charged.

Note that, for example, like the electronic controller 42 and the electric motor 43 shown in FIG. 2, for example, the electronic controller 42-2 and the electric motor 43-2 shown in FIG. 11 may define, for example, the mechanically/electrically integrated electric motor having the structure shown in FIG. 6.

Figure 1:
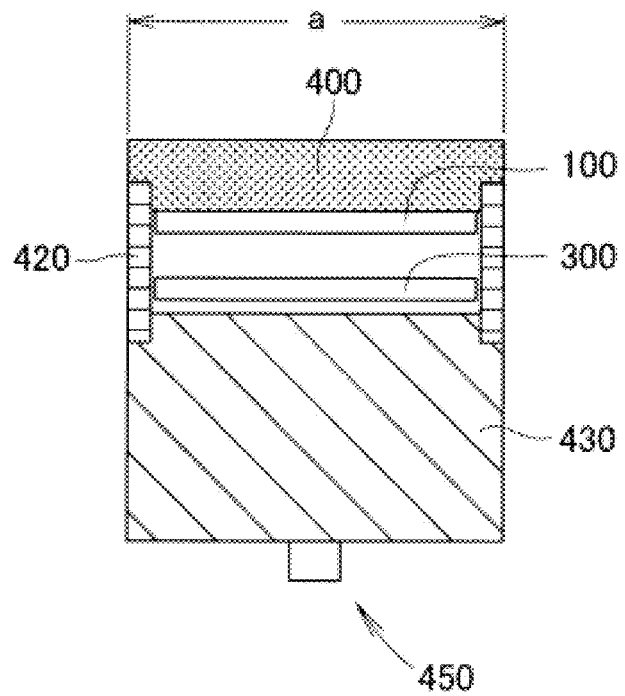
FIGS. 1A and 1B include respective views of first and second comparative examples.
Figure 1:
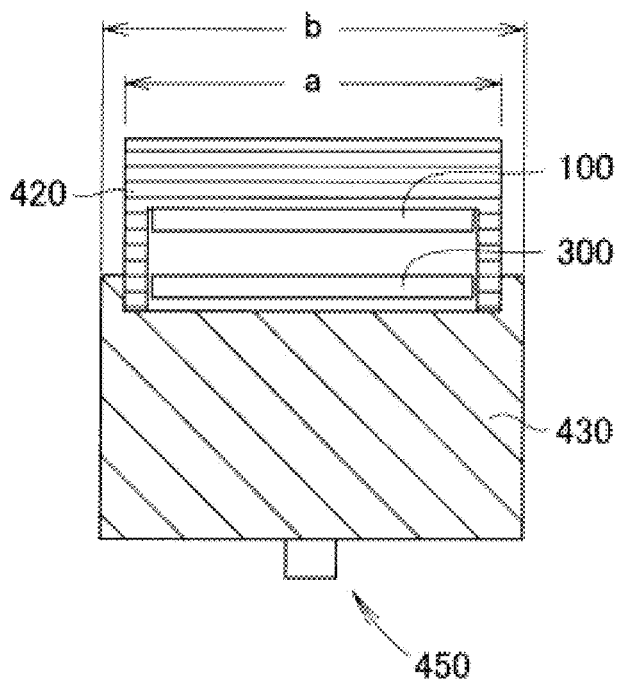

The driving electronic controller 42-2 performs regenerative cooperative control in which regenerative braking and hydraulic braking are combined. Note that, when the vehicle is an electric vehicle, the rear wheels 3, 3 may be driven by the electric motor 43-2 instead of the steering wheels 29, 29 (the front wheels) or in addition to the steering wheels 29, 29 (the front wheels). Alternatively, when the vehicle is a hybrid vehicle, an output shaft of an engine E (an internal combustion engine) indicated by an alternate long and two short dashes line in FIG. 1 is coupled to the front wheel axle 4 via a differential mechanism (not shown in the figure). Similarly, the rear wheels 3, 3 may be driven by the engine E.

The vehicle may also include, for example, a known disk brake system. A caliper including a disk 2a and a wheel cylinder 2b is provided in, for example, each of the left and right steering wheels 29, 29 (the front wheels). Similarly, a disk 3a and a wheel cylinder 3b are provided in, for example, each of the left and right rear wheels 3, 3. A brake hydraulic pressure generating device 8 is connected to the wheel cylinders 2b, 2b, 3b, and 3b via publicly-known brake pipes.

Note that a pedal position sensor 611a that detects the position of the brake pedal 611 (a pedal position) is provided in the brake pedal 611. The pedal position sensor 611a is able to detect a step-on amount (a brake operation amount) of the driver with an initial state (e.g., the pedal position=0) set in a state in which the brake pedal 611 is not stepped on by the driver. A signal of the detection is supplied from a pedal position sensor 11a to the electronic controller 42-1 of the electric servo brake via, for example, an external connector (not shown in the figure) same as the external connector shown in FIG. 6. Similarly, electric power from the battery 61 (the battery for electric equipment) is supplied from the battery 61 to the electronic controller 42-1 of the electric servo brake via the external connector (not shown in the figure).

The electric servo brake system includes the electronic controller 42-1 of the electric servo brake. The electronic controller 42-1 of the electric servo brake preferably performs a portion of regenerative control in cooperation with the electronic controller 42-2 in order to realize a regenerative brake function. The electronic controller 42-1 of the electric servo brake is able to generate brake hydraulic pressure of a cylinder (not shown in the figure), which depends on the driving of the electric motor 43-2 included in the brake hydraulic pressure generating device 8, on the basis of a detection signal from the pedal position sensor 11a.

The present invention is not limited to the illustrative preferred embodiments described above. Those skilled in the art could easily change the illustrative preferred embodiments to the extent within the scope of claims. Specifically, while preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle-mounted electronic controller that drives and controls an electric motor, the vehicle-mounted electronic controller comprising:
   a case including a controller housing;
   a lid body that covers an upper portion of the controller housing;
   power circuitry including a switching circuit that supplies a driving signal to the electric motor and a power board on which the switching circuit is mounted; and
   control circuitry including a control circuit that controls the switching circuit; wherein
   the lid body is made of a material having a heat radiation property higher than a heat radiation property of the power circuitry;
   the controller housing accommodates the power circuitry and the control circuitry;
   a lower surface of the lid body is in contact with an upper surface of the power circuitry;
   an upper surface of the lid body is exposed;
   the vehicle-mounted electronic controller includes a connector case extending from a lower side of the lid body toward an upper side of the lid body; and
   the connector case includes an external connector projecting farther to the upper side than the upper surface of the lid body;
   the control circuitry overlaps the power circuitry in a vertical direction on the lower side of the power circuitry;
   the lid body includes:
      a main body extending perpendicularly to the vertical direction; and
      a heat radiation fin extending toward the upper side from an upper surface of the main body;
   a region farther on an inner side than the controller housing in plan view includes:
      a connector region where the connector case is disposed; and
      a heat radiation fin region where the heat radiation fin is disposed on the upper surface of the lid body;
   the power circuitry is thermally in contact with the lower side of the heat radiation fin region in the main body;
   the connector region includes:
      a lower connector region on the lower side of the lid body; and
      an upper connector region on the upper side of the lid body; and
   the upper connector region has an area larger than the area of the lower connector region.

2. The vehicle-mounted electronic controller according to claim 1, wherein the connector case further includes:
   a plurality of terminals connected to an outside via the external connector;
   a tabular extension extending out perpendicularly to the vertical direction from the lower side of the external connector; and
   an internal connector projecting farther to the lower side than the lid body from the tabular extension, the plurality of terminals being disposed on an inside of the internal connector; and
   the internal connector is disposed farther apart from the heat radiation fin region than the external connector.

3. The vehicle-mounted electronic controller according to claim 1, wherein the external connector includes a connector to which a torque signal is input.

4. The vehicle-mounted electronic controller according to claim 2, wherein the plurality of terminals are connected to the control circuitry; and portions of the plurality of terminals connected to the control circuitry are exposed from the internal connector.

5. The vehicle-mounted electronic controller according to claim 4, wherein the internal connector extends farther downward than a lower surface of the power circuitry.

6. The vehicle-mounted electronic controller according to claim 2, wherein a lower surface of the tabular extension includes a connector groove that is in contact with the upper surface of the lid body and surrounds the internal connector;

an O-ring is disposed in the connector groove; and on the lower surface of the tabular extension, a region not surrounded by the connector groove is larger than a region surrounded by the connector groove.

7. The vehicle-mounted electronic controller according to claim 2, wherein the lid body includes a pedestal that supports the control circuitry;

the control circuitry is fixed to the pedestal by a second fixing member;

the pedestal extends from a lower surface of the main body to an upper surface of the control circuitry; and a side surface of the internal connector is in contact with a side surface of the pedestal.

8. The vehicle-mounted electronic controller according to claim 5, wherein the controller housing includes a wall having a hollow cylindrical shape;

the lid body includes an attaching section recessed to an upward direction at an outer edge portion of the lower surface;

a lower surface of the attaching section is in contact with at least a portion of a top surface of the wall;

a side surface of the attaching section includes a recess in which an O-ring is able to be fixed;

in a longitudinal section, the wall includes an inner wall surface corresponding to the recess and perpendicular to the lower surface of the lid body; and the O-ring is in contact with the recess of the lid body and the inner wall surface.

9. The vehicle-mounted electronic controller according to claim 1, wherein the connector case is in contact with the upper surface of the main body in the connector region.

10. The vehicle-mounted electronic controller according to claim 1, wherein the power circuitry is thermally in contact with the lower side of the heat radiation fin region in the main body.

11. The vehicle-mounted electronic controller according to claim 10, wherein the switching circuit overlaps the heat radiation fin in the vertical direction.

12. The vehicle-mounted electronic controller according to claim 1, wherein at least a portion of the power circuitry overlaps the heat radiation fin and the connector case in the vertical direction.

13. The vehicle-mounted electronic controller according to claim 1, wherein the power circuitry further includes:

a metal board mounted with the switching circuit; and at least one electrolytic capacitor that smoothes a power supply voltage, which is a source of the driving signal;

the at least one electrolytic capacitor is mounted on a first surface of the metal board; and the switching circuit and the at least one electrolytic capacitor are mounted on a surface of the metal board different from the first surface.

14. A vehicle-mounted mechanically/electrically integrated electric motor comprising the vehicle-mounted electronic controller according to claim 1, wherein the case further includes a motor case that is disposed farther on the lower side than the controller housing and accommodates the electric motor; and the controller housing and the motor case are integrally provided as a single monolithic member.

15. A vehicle-mounted electronic controller that drives and controls an electric motor, the vehicle-mounted electronic controller comprising:

a case including a controller housing;

a lid body that covers an upper portion of the controller housing;

power circuitry including a switching circuit that supplies a driving signal to the electric motor and a power board on which the switching circuit is mounted; and control circuitry including a control circuit that controls the switching circuit; wherein the lid body is made of a material having a heat radiation property higher than a heat radiation property of the power circuitry;

the controller housing accommodates the power circuitry and the control circuitry;

a lower surface of the lid body is in contact with an upper surface of the power circuitry;

an upper surface of the lid body is exposed;

the controller housing includes a wall having a hollow cylindrical shape;

the lid body includes an attaching section recessed to an upward direction at an outer edge portion of the lower surface;

a lower surface of the attaching section is in contact with at least a portion of a top surface of the wall;

a side surface of the attaching section includes a recess in which an O-ring is able to be fixed;

in a longitudinal section, the wall includes an inner wall surface corresponding to the recess and perpendicular to the lower surface of the lid body; and the O-ring is in contact with the recess of the lid body and the inner wall surface.

16. The vehicle-mounted electronic controller according to claim 15, wherein the vehicle-mounted electronic controller includes a connector case extending from a lower side of the lid body toward an upper side of the lid body; and the connector case includes an external connector projecting farther to the upper side than the upper surface of the lid body; and the control circuitry overlaps the power circuitry in a vertical direction on the lower side of the power circuitry.

17. The vehicle-mounted electronic controller according to claim 16, wherein the lid body includes:

a main body extending perpendicularly to the vertical direction; and a heat radiation fin extending toward the upper side from an upper surface of the main body.

18. The vehicle-mounted electronic controller according to claim 17, wherein a region farther on an inner side than the controller housing in plan view includes:

a connector region where the connector case is disposed; and a heat radiation fin region where the heat radiation fin is disposed on the upper surface of the lid body.

19. The vehicle-mounted electronic controller according to claim 18, wherein the connector case is in contact with the upper surface of the main body in the connector region.

20. The vehicle-mounted electronic controller according to claim 18, wherein the power circuitry is thermally in contact with the lower side of the heat radiation fin region in the main body.

21. The vehicle-mounted electronic controller according to claim 20, wherein the switching circuit overlaps the heat radiation fin in the vertical direction.

22. The vehicle-mounted electronic controller according to claim 15, wherein at least a portion of the power circuitry overlaps the heat radiation fin and the connector case in the vertical direction.

23. The vehicle-mounted electronic controller according to claim 15, wherein the power circuitry further includes:
   a metal board mounted with the switching circuit; and
   at least one electrolytic capacitor that smoothes a power supply voltage, which is a source of the driving signal;
   the at least one electrolytic capacitor is mounted on a first surface of the metal board; and
   the switching circuit and the at least one electrolytic capacitor are mounted on a surface of the metal board different from the first surface.

24. A vehicle-mounted mechanically/electrically integrated electric motor comprising the vehicle-mounted electronic controller according to claim 15, wherein
   the case further includes a motor case that is disposed farther on the lower side than the controller housing and accommodates the electric motor; and
   the controller housing and the motor case are integrally provided as a single monolithic member.

* * * * *